US008473084B2

(12) United States Patent
Lindahl et al.

(10) Patent No.: US 8,473,084 B2
(45) Date of Patent: Jun. 25, 2013

(54) AUDIO CROSSFADING

(75) Inventors: Aram Lindahl, Menlo Park, CA (US);
Alexander Kanaris, San Jose, CA (US);
Joseph M. Williams, Dallas, TX (US);
Richard M. Powell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 12/873,924

(22) Filed: Sep. 1, 2010

(65) Prior Publication Data
US 2012/0053710 A1 Mar. 1, 2012

(51) Int. Cl.
*G06F 17/00* (2006.01)
(52) U.S. Cl.
USPC ........................................................ 700/94
(58) Field of Classification Search
USPC .... 700/94; 704/500–504; 381/119; 369/1–12
See application file for complete search history.

(56) References Cited

U.S. PATENT DOCUMENTS

| 5,742,532 A * | 4/1998 | Van Duyne et al. .......... 708/313 |
| 5,781,461 A | 7/1998 | Jaffe et al. |
| 5,974,015 A * | 10/1999 | Iizuka et al. .................. 386/201 |
| 6,049,766 A | 4/2000 | Laroche |
| 6,718,309 B1 | 4/2004 | Selly |
| 7,302,396 B1 * | 11/2007 | Cooke .......................... 704/500 |
| 2009/0024234 A1 * | 1/2009 | Archibald ...................... 700/94 |
| 2010/0063825 A1 | 3/2010 | Williams et al. |

* cited by examiner

*Primary Examiner* — Andrew C Flanders
(74) *Attorney, Agent, or Firm* — Blakely, Sokoloff, Taylor & Zafman LLP

(57) ABSTRACT

Techniques are presented for dynamically controlling an audio crossfade from a first audio track to a second audio track. The first audio track may be decoded and buffered to a first buffer. A user may select a second audio track at some point during playback of the first audio track. The second audio track may be decoded, and a processor may access the decoded second audio track and the buffered first audio track and mix the two audio tracks. The mixed audio track may be inserted in the same first buffer near or at the read pointer of the first buffer, such that latency between the user selection and the crossfade into the selected audio track may be minimized. The insertion of the mixed audio track may depend on various factors, including the type of audio file and/or the decoder type used to decode the second audio track.

22 Claims, 4 Drawing Sheets

AUDIO CROSSFADING

BACKGROUND

The present disclosure relates generally to audio playback in electronic devices, and more particularly to crossfading during audio playback This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices are widely used for a variety of tasks. Among the functions provided by electronic devices, audio playback, such as playback of music, audiobooks, podcasts, lectures, etc., is one of the most widely used. Such electronic devices may play audio tracks stored as audio files encoded in a number of different formats (e.g., MPEG-1 Audio Layer 3 (MP3), Advanced Audio Coding (AAC), etc.). The audio file may typically be stored in non-volatile memory, and may be accessed, decoded, and output as audio playback.

During playback, it may be desirable to have an audio stream, i.e., audio track, "fade" out while another audio stream fades in. Such a technique is referred to as "crossfading." For example, the end of a first audio stream may be slowly faded out (e.g., by decreasing the playback volume of the track), and the beginning of a second audio stream may be slowly faded in (e.g., by increasing the playback volume of the track).

Typically, crossfading may be performed by decoding and buffering each of the first and second audio tracks, retrieving the buffered data, and mixing the buffered data sample by sample to generate a crossfaded output of the two audio tracks. The mixed data may be buffered and accessed for processing and output to an audio output device (e.g., headphone, speakers, etc.). Such crossfade methods may generally be performed for scheduled crossfades (e.g., in a set playlist of audio files) with little or no latency, as a decoder may begin to decode a second audio track before and in anticipation of a scheduled crossfade. However, crossfades may not always be scheduled or anticipated, as a user may desire to change from one audio track to a number of different audio tracks at any time during playback, before the first audio track has completely played. As electronic devices offer increasingly flexible user interface options which allow a user to command such unscheduled transitions between audio tracks, typical crossfading methods may result in latency or other undesirable playback effects.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments include techniques for dynamically controlling the crossfade between a first audio track and a second audio track. In one embodiment, an electronic device is provided that includes a processor, a decoder, and a memory coupled to a buffer. The memory may store one or more encoded audio files, and the buffer may store decoded audio data. The decoder accesses the encoded audio files from the memory, decodes the audio files, and transmits the decoded audio data to the buffer. In some embodiments, a first audio track may be decoded into data samples and stored in a buffer. A read pointer may retrieve decoded data samples from the buffer for playback of the first audio track. When a second audio track is selected, the second audio track may be decoded, and a processor may access the decoded data samples of the second audio track and the decoded data samples of the first audio track from the first buffer and combine the data samples of the two audio tracks. The combined data samples, also referred to as the mix or the crossfade, may be written to the same buffer.

The processor may position a write pointer for the crossfade to a position in the first buffer to minimize the distance between the read pointer and the write pointer, thus reducing and/or minimizing the latency between the user command for the second audio track and the playback of the crossfade into the second audio track. In some embodiments, the positioning of the write pointer may also be based on various factors to ensure that the read pointer does not overrun the write pointer. Therefore, in one or more embodiments, an audio crossfade from a first audio track to a second audio track may be dynamically controlled to minimize latency while preventing other negative audio effects.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
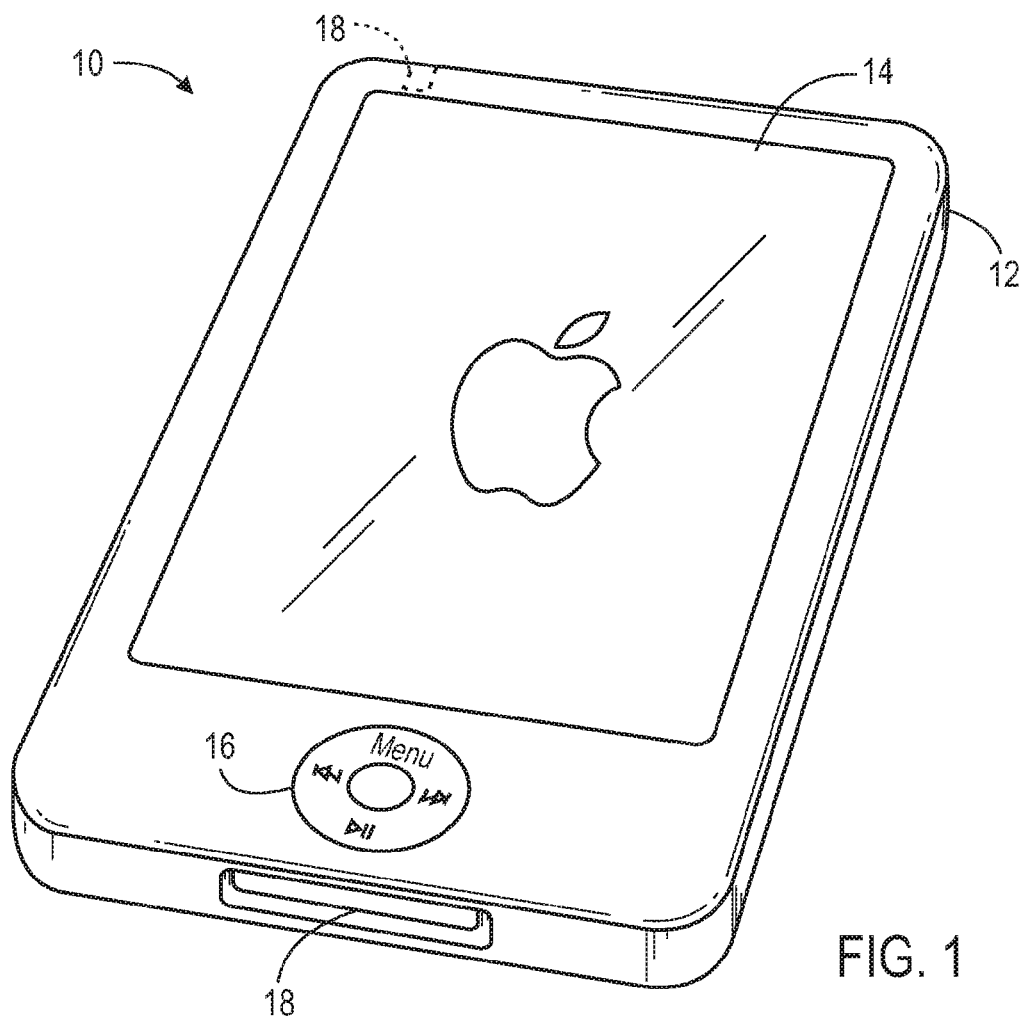
FIG. 1 is a perspective view illustrating an electronic device, such as a portable media player, in accordance with one embodiment of the present disclosure.

Turning now to the figures, FIG. 1 depicts an electronic device 10 in accordance with one embodiment of the present disclosure. In some embodiments, the electronic device 10 may be a media player for playing music and/or video, a cellular phone, a personal data organizer, or any combination thereof. Thus, the electronic device 10 may be a unified device providing any one of or a combination of the functionality of a media player, a cellular phone, a personal data organizer, and so forth. In addition, the electronic device 10 may allow a user to connect to and communicate through the Internet or through other networks, such as local or wide area networks. For example, the electronic device 10 may allow a user to communicate using e-mail, text messaging, instant messaging, or using other forms of electronic communication. By way of example, the electronic device 10 may be a model of an iPod® having a display screen or an iPhone® available from Apple Inc. While the present discussion and examples described herein generally reference an electronic device 10 which is portable, such as that depicted in FIG. 1, it should be understood that the techniques discussed herein may be applicable to any electronic device having audio playback capabilities, regardless of the portability of the device.

In the depicted embodiment, the electronic device 10 includes an enclosure 12, a display 14, user input structures 16, and input/output connectors 18. The enclosure 12 may be formed from plastic, metal, composite materials, or other suitable materials or any combination thereof. The enclosure 12 may protect the interior components of the electronic device 10 from physical damage, and may also shield the interior components from electromagnetic interference (EMI).

The display 14 may be a liquid crystal display (LCD) or may be a light emitting diode (LED) based display, an organic light emitting diode (OLED) based display, or other suitable display. Additionally, in one embodiment the display 14 may be a touch screen through which a user may interact with the user interface.

In one embodiment, one or more of the user input structures 16 are configured to control the device 10, such as by controlling a mode of operation, an output level, an output type, etc. For instance, the user input structures 16 may include a button to turn the device 10 on or off. In general, embodiments of the electronic device 10 may include any number of user input structures 16, including buttons, switches, a control pad, keys, knobs, a scroll wheel, or any other suitable input structures. The input structures 16 may work with a user interface displayed on the device 10 to control functions of the device 10 or of other devices connected to or used by the device 10. In some embodiments, the user input structures 16 may allow a user to control the audio playback of audio tracks. For example, a user may use the user input structures 16 to select one of several audio tracks for playback after a currently playing audio track. Furthermore, the user may use the user interface structures 16 to initiate a crossfade at any point during playback from the currently playing audio track to the selected subsequent audio track.

The electronic device 10 may also include various input and/or output ports 18 to allow connection of additional devices. For example, a port 18 may be a headphone jack that provides for connection of headphones. Additionally, a port 18 may have both input/output capabilities to provide for connection of a headset (e.g. a headphone and microphone combination). Embodiments of the present disclosure may include any number of input and/or output ports, including headphone and headset jacks, universal serial bus (USB) ports, FireWire® or IEEE-1394 ports, and AC and/or DC power connectors.

Figure 2:
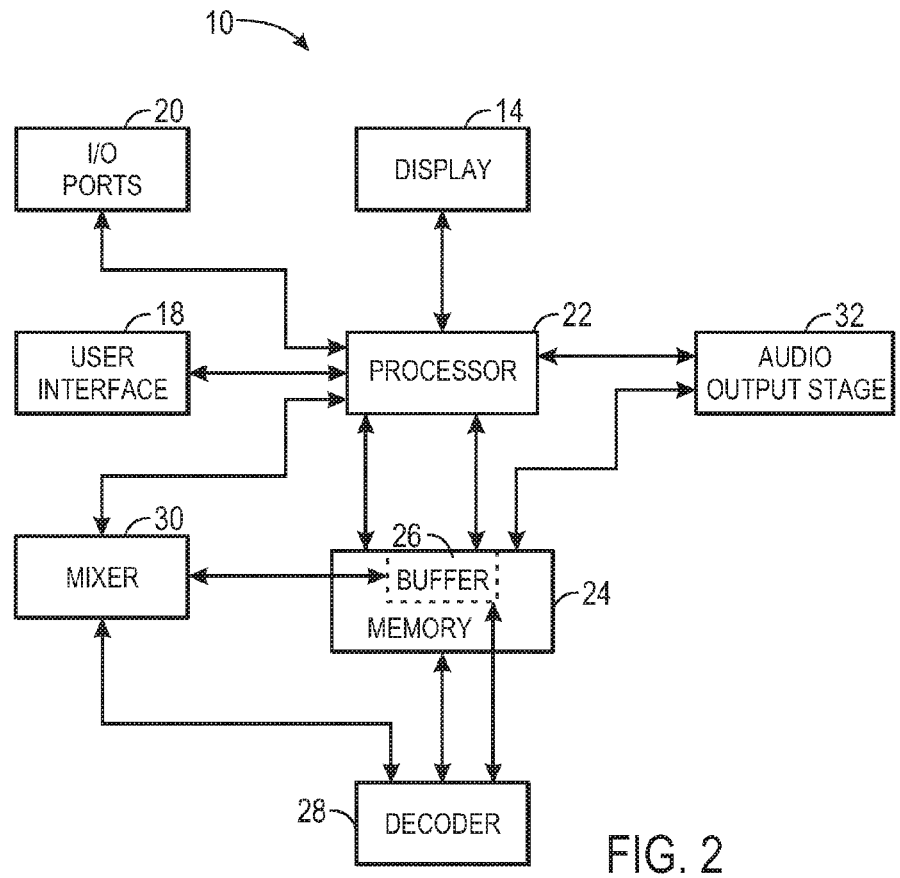
FIG. 2 is a simplified block diagram of the portable media player of FIG. 1 in accordance with one embodiment of the present disclosure.

Turning now to FIG. 2, a block diagram of components of an illustrative electronic device 10 is shown. The block diagram includes the display 14 and I/O ports 18 discussed above. In addition, the block diagram illustrates the user interface 20, one or more processors 22, a memory 24, a buffer 26, one or more decoders 28, a mixer 30, and an audio output stage 32.

As discussed herein, in certain embodiments the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements or other components that may be displayed in all or some of the areas of the display 14.

The user interface 20 may, in certain embodiments, allow a user to interface with displayed interface elements via the one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, a combination of general and special purpose microprocessors, and/or ASICS. For example, the processor(s) 22 may include one or more reduced instruction set (RISC) processors, such as a RISC processor manufactured by Samsung, as well as graphics processors, video processors, and/or related chip sets.

Embodiments of the electronic device 10 may also include a memory 24. The memory 24 may include a volatile memory, such as RAM, and a non-volatile memory, such as ROM. The memory 24 may store a variety of information and may be used for a variety of purposes. For example, the memory 24 may store the firmware for the device 10, such as an operating system for the device 10 and/or any other programs or executable code necessary for the device 10 to function. The memory 24 may also store data files such as media (e.g., music and video files), software (e.g., for implementing functions on device 10), preference information (e.g., media playback preferences), and any other suitable data.

In addition, the memory 24 may also be coupled to a buffer 26 which may be used for buffering or caching during operation of the device 10. The buffer 26 may be suitable for storing decoded audio data samples before the data is accessed for further processing and/or output for playback. For example, the buffer 26 may store data corresponding to decoded portions of a currently playing (i.e., first) audio track, decoded portions of a subsequently selected (i.e., second) audio track, and combinations (i.e., mixtures, crossfades) of the first and second audio tracks.

To process and decode audio data, the device 10 may include one or more decoders 28. In one implementation a decoder 28 may decode audio data encoded in a particular format. As used herein, the term decoding may include decompressing, decrypting, or any other technique to convert data from one format to another format. The device 10 may include more than one decoder 28 to decode various types of encoded audio files. Encoding formats may include, but are not limited to, MP3, AAC, ACCPlus, Ogg Vorbis, MP4, MP3Pro, Windows Media Audio, or any suitable format. It should be appreciated that a decoder 28 may also be suitable for decoding more than one type of audio file, and may also have any other suitable functions and capabilities. Thus, in some embodiments, the decoder 28 may also be referred to as a codec, an accelerator, etc.

After decoding, the data from the audio files may be streamed to memory 24, the I/O ports 18, or any other suitable component of the device 10 for playback. To playback audio files, the device may output the decoded data to an audio output stage 32, which may amplify and further process the data for different types of audio outputs for playback. For example, for proper playback, certain amplification of the audio data may be suitable for various types of outputs (e.g., headphones, speakers, etc.).

In the transition between two audio streams during playback, the device 10 may crossfade audio streams, such as by "fading out" playback of a first audio stream while simultaneously "fading in" playback of a second audio stream. Each audio stream may be a decoded stream from encoded data such as an audio file, and each stream may be decoded from the same or a different format. For example, the first audio stream may be decoded from an MP3 audio file, and the second audio stream may be decoded from an AAC audio file. After the second audio stream is faded in, and the first audio stream is faded out, the transition to any additional audio streams may also include crossfading.

Figure 3:
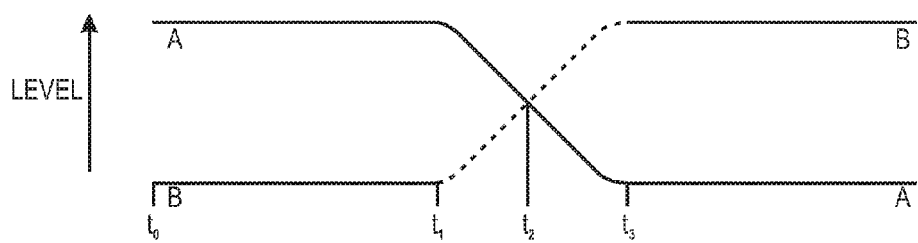
FIG. 3 is a graphical illustration of crossfading of two audio tracks in accordance with an embodiment of the present disclosure.

FIG. 3 is a graphical illustration of the crossfading of two audio streams A and B. The "level" of each stream A and B is represented on the y-axis of FIG. 3. In an embodiment, the level may refer to the output volume, power level, or other parameter of the audio stream that determines the level of sound a user would hear at the real-time output of the streams A and B. The combined streams of A and B as illustrated in FIG. 3 and during playback may be referred to as the "mix."

The x-axis of FIG. 3 indicates the time elapsed during playback of the audio streams A and B. For example, at t0, the first stream A is playing at the highest level, and stream B is playing at the lowest level or is not playing at all. The point t0 represents normal playback of stream A without any transition. At point t1, the crossfading of streams A and B begins. For example, point t1 may occur if stream A is reaching the end of the duration of the stream (for example, the last ten seconds of a song), and the device 10 can provide a fading transition between stream A and stream B to the user.

At point t1, stream B begins to increase in level and stream A begins to decrease in level. Between t1 and t2, the level of stream A is reduced, while the level of stream B increases, crossfading the two streams A and B. At t3, stream A has ended or is reduced to the lowest level, and stream B is at the highest level. As stream B nears the end of its duration, another stream may be added to the mix using the crossfading techniques described above, e.g., stream B is decreased in level and the next stream is increased in level.

Figure 4:
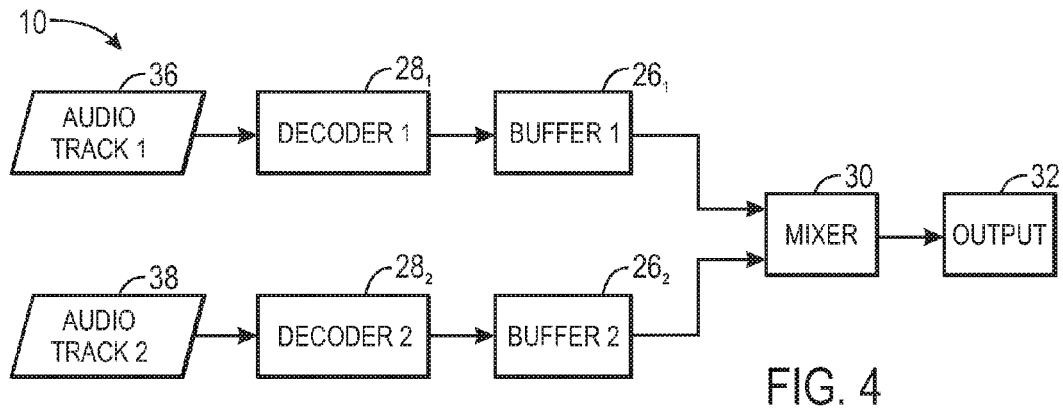
FIG. 4 is a block diagram of a typical crossfading technique for two audio tracks.

Performing the crossfade represented in FIG. 3 typically involves using one or more decoders 28 and buffers 26. The diagram illustrated in FIG. 4 depicts a typical crossfade 34 of a first audio track 36 and a second audio track 38. Because each audio track 36 and 38 may use different encoding formats, different decoders 28 (i.e., codecs) may be used to decode each encoded track 36 and 38. Typically, the decoded first audio track 36 may be buffered at a first buffer 26$_1$, and a processor 22 (FIG. 2) will access the first buffer 26$_1$ and process the decoded data and output it for playback. A crossfade from the first audio track 36 to the second audio track 38 may be performed by decoding the second audio track 38 and the same or different decoder 28$_2$ and storing the decoded second audio track 38 to another buffer 26$_2$. A processor 22 or a mixer 30 coupled to the processor 22 may access the buffered data samples of the first and second audio tracks 36 and 38 from their respective buffers 26$_1$ and 26$_2$. The mixer 30 may use crossfade algorithms to combine samples of the first and second audio tracks 36 and 38 to generate a mixture, or a crossfade of the two tracks 36 and 38. The crossfade track may be transmitted to an audio output stage 32, for example, which may perform post-processing, including appropriate filtering and/or amplification based on the audio output device (e.g., headset, speaker, etc.).

Some embodiments include techniques for improving the continuity from one audio track to another by decreasing the latency of transitions from one audio track to another during playback. Latency may be described as the time between a command to transition audio tracks to the actual transition (e.g., crossfade) from the first to the second audio tracks. The command may be in the form of a scheduled transition (e.g., a particular second audio track may begin at the end of the first audio track) or an unscheduled transition (e.g., a user may select from one of several second audio tracks at any point before the first audio track is completed). During scheduled transitions, a processor 22 may initiate the decoding of the second audio track 38 prior to and in anticipation of a scheduled crossfade, such that the latency between a transition from one audio track to another may not be perceivable. However, during unscheduled transitions, a decoder 28 may not begin decoding the second audio track 38 until after the transition has been commanded. Using the typical crossfade techniques 34, the mixer 30 then accesses two different buffers 26$_1$ and 26$_2$ to mix the crossfade track. Such techniques may result in a perceivable latency between an unscheduled user command and a crossfade.

Figure 5:
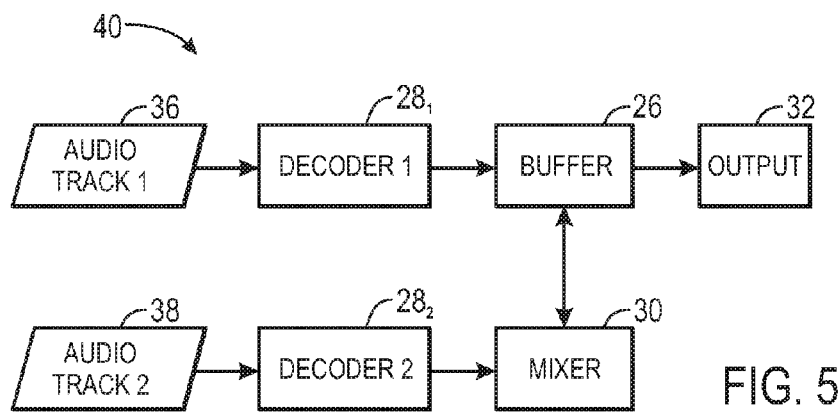
FIG. 5 is a block diagram of a crossfading technique using one buffer, in accordance with an embodiment of the present disclosure.

In some embodiments, latency between a command and a crossfade may be reduced or minimized by employing one buffer for storing a decoded first audio track, a crossfade of the first and second audio track, and the decoded second audio track. As depicted in FIG. 5, a single buffer crossfade technique 40 may involve decoding the first audio track 36 at a first decoder 28$_1$ and storing the decoded data samples of the first audio track 36 to a buffer 26. A processor 22 may access the buffered data samples of the first audio track 36 and further process it for playback. For example, the data samples of the first audio track 36 may be transmitted to an audio output stage 32 for appropriate processing and/or amplification, based on an audio output device.

During a crossfade from the first audio track 36 to the second audio track 36, the encoded file of the second audio track 38 may be decoded by the same or a different decoder 28$_2$. The decoded data samples of the second audio track 38 may be accessed by a mixer 30, which also accesses the data samples of the first audio track 36 from the buffer 26. The mixer 30 may mix the decoded data samples for the first and second audio tracks 36 and 38. For example, the mixer 30 may apply various algorithms (e.g., compute weighted averages of the data from each audio track 36 and 38, apply time varying weighting functions to apply different mixing curves, etc.) to mix the two tracks 36 and 38, generating a mixture (e.g., crossfade) of the two tracks 36 and 38.

The crossfade track may be written into the same buffer 26 which originally stored the decoded first audio track 36. Therefore, rather than obtaining data from two separate buffers (as in FIG. 4), data may be read from one buffer 26 and output (e.g., to an audio output stage 32) with reduced latency. In some embodiments, latency may be reduced to approximately 50 ms or less (e.g., approximately 15 ms to 50 ms, or approximately 0 ms in some embodiments).

Figure 6:
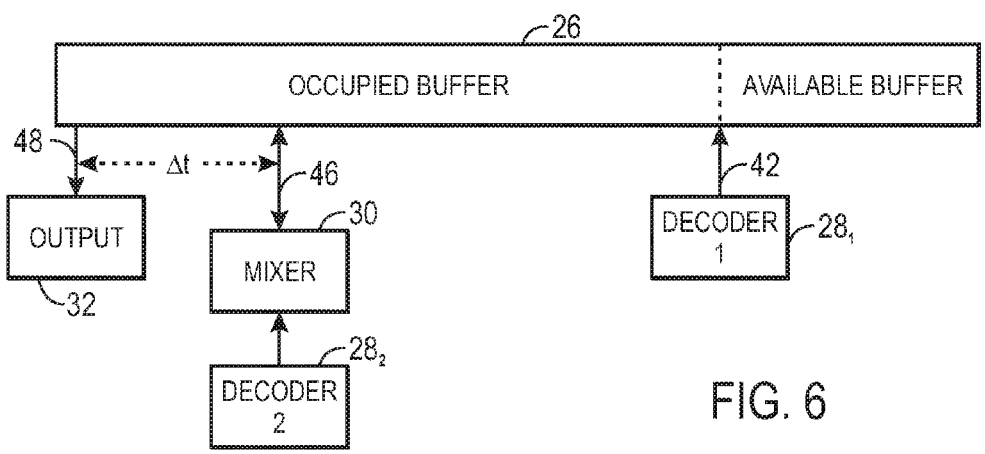
FIG. 6 is a schematic diagram representing pointer positions in the buffer illustrated in FIG. 5, in accordance with an embodiment of the present disclosure.

A more detailed depiction of the single buffer 26 and the positioning of read and write pointers in the buffer 26 are provided in FIG. 6. In some embodiments, two write pointers may point to two different positions in the buffer 26. A first write pointer 42 may point to a position in the buffer 26 for storing data from the decoded first audio track 36. For example, the first write pointer 42 may point to the end of an occupied portion of the buffer 26 to write data into the available portion of the buffer 26. The second write pointer 44 may point to a position in the buffer for storing data from the decoded second audio track 38. Additionally, the second write pointer 44 may also point to the position from which data from the first audio track 36 is accessed from the buffer 26 by the mixer 30. The mixer 30 may combine data samples of the first and second tracks 36 and 38 during a crossfade operation. After a crossfade operation is complete (e.g., after the first audio track 36 has completely faded out), only samples from the decoded second audio track 38 may be written at the second write pointer 44 until the next transition (e.g., to a third audio track) is commanded.

A read pointer 48 represents the position in the buffer 26 from which audio samples are transmitted to the output 32. In some embodiments, the processor 22 may dynamically position the second write pointer 46 in the buffer 26. Generally, the second write pointer 46 may be positioned close to the read pointer 46 to minimize the latency (represented as $\Delta t$) between the transition command and the actual crossfade. However, the second write pointer 46 may also be offset from the read pointer 46 to avoid the read pointer 46 overrunning the second write pointer 46. The read pointer 46 may overrun the second write pointer 46 if the read pointer 48 reads from the buffer 26 more quickly than the buffering of the crossfade to the buffer 26, which may result in undesirable audio effects, such as skips, pauses, etc.

Since the offset of the second write pointer 46 depends at least in part on the availability of the crossfade written to the buffer 26, a safe offset between the read pointer and the second write pointer 46 may depend on how quickly the second audio track 38 may be decoded, mixed, and/or processed to generate the crossfade. A number of factors may affect the decoding and/or processing of the second audio track 38, and such factors may be considered by the processor 22 in determining the appropriate size of the offset. Such factors may include characteristics relating to the format of the second audio track 38, the type of decoder 28 used to decode the second audio track 38, the complexity of post processing effects (e.g., the processing of data retrieved from buffer before output), and/or the media type associated with the second audio track 38. For example, if the granularity of the codec output of the second audio stream 38 is relatively large, the offset between the read pointer 48 and the crossfade write pointer 46 may be increased. Different audio tracks may also have different codecs, which may be decoded at different rates. For example, the WAVE format may typically be a faster codec format than a high efficiency AAC. Accordingly, the processor 22 may determine that a smaller offset may be safely used when inserting the crossfade to a WAVE encoded audio track as compared to the crossfade to an AAC encoded audio track. Furthermore, hard disk drive (H.D.D.) media may have greater latency than flash media. As such, the processor 22 may position the second write pointer 46 to have a greater offset if the second audio track 38 selected for the crossfade operation is in HDD, as opposed to in flash.

The processor 22 may evaluate any combination of relevant factors which generally affect the decoding, mixing, and post processing of the second audio track 38 such that for each crossfade operation, the crossfade write pointer 46 may be pointed to a position in the buffer 26 to minimize latency, discontinuity (e.g., skips, pauses, stalls, etc.), and/or other undesirable audio effects. Since the second audio track 38 may have one of several codec formats and may have a number of other different characteristics relating to decoding and/or processing, the positioning of the second write pointer 46 may be dynamically determined before each crossfade operation.

Figure 7:
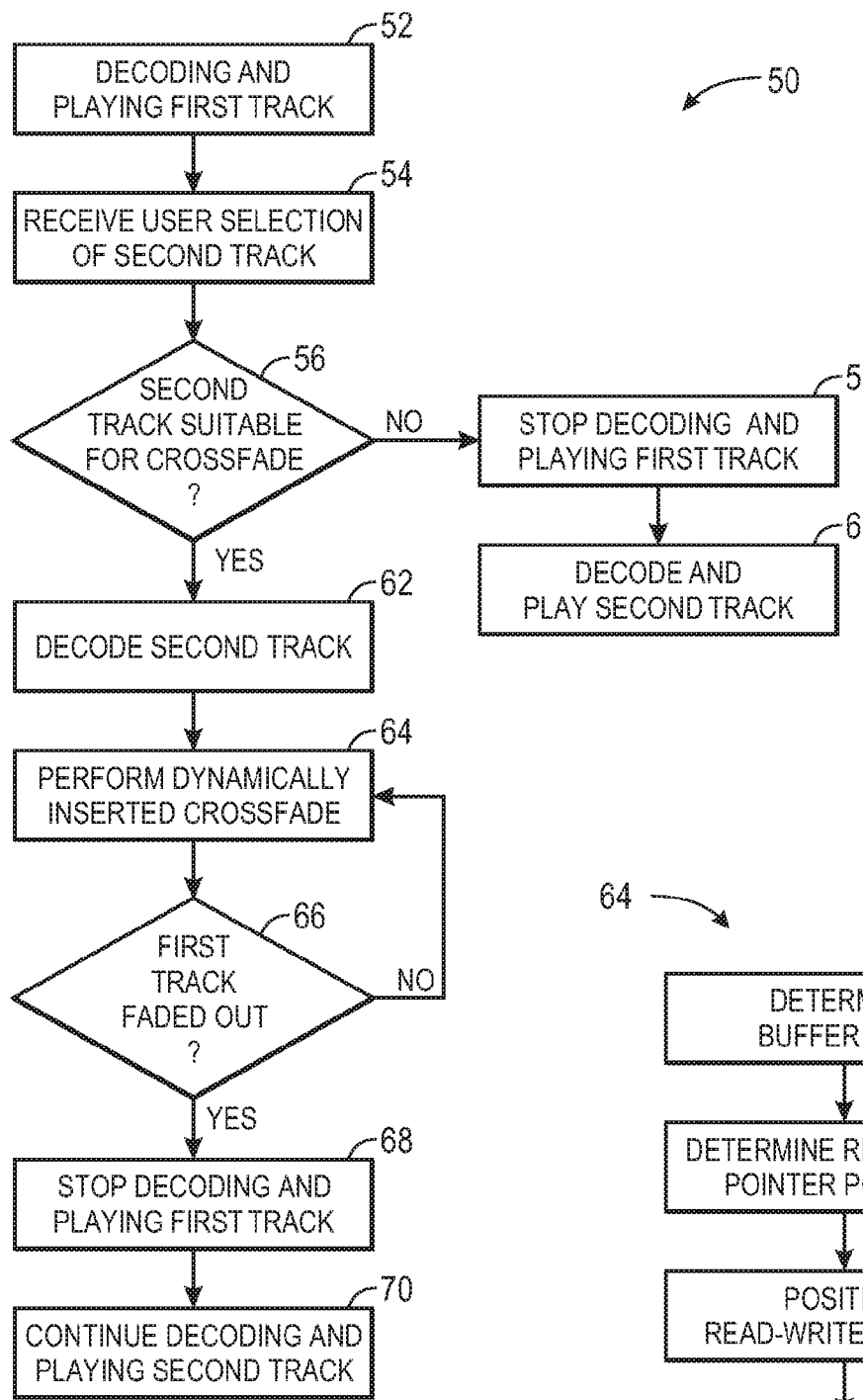
FIG. 7 is a flow chart of a general process for crossfading, in accordance with an embodiment of the present disclosure.

A general process for performing a crossfade operation in accordance with the present techniques is presented in the flow chart of FIG. 7. The process 50 begins when the first audio track 36 being decoded and played (block 52). At any time during the playback of the first audio track 36, the electronic device 10 may be commanded to transition from the first audio track 36 to a second audio track 38. For example, as discussed, such a command may be an unscheduled command by a user to switch to a different audio track 38 before the first audio track 36 is finished. The device 10 may receive (block 54) the user selection of the second audio track 38 and determine (block 56) whether the selected track is suitable for performing a crossfade operation. If the selected track is not suitable for performing a crossfade operation, a crossfade operation may not occur, and the processor 22 may simply stop decoding and playing the first audio track (block 58) and begin decoding and playing the second audio track (block 60).

If the second audio track 38 is determined (block 56) to be suitable for a crossfade operation, the device 10 may perform (block 64) a dynamically inserted crossfade. As discussed, a crossfade of mixed samples from a first and second audio track may be dynamically positioned in a single buffer 26 based on various factors associated with each crossfade operation. Further details of the dynamically inserted crossfade will be discussed in FIG. 8. The device 10 may then determine (block 66) whether the first audio track 36 has completely faded out. If not, the crossfade may continue until the first audio track 36 has completely faded. Once the first audio track 36 has completely faded, the crossfade operation may be over, and the device 10 may stop decoding and playing the first audio track 36 (block 68) and continue decoding and playing the second audio track 38 (block 70). The process 50 may repeat for each subsequently commanded transition (e.g., transition from the second audio track 38 to a third audio track, and so forth).

Figure 8:
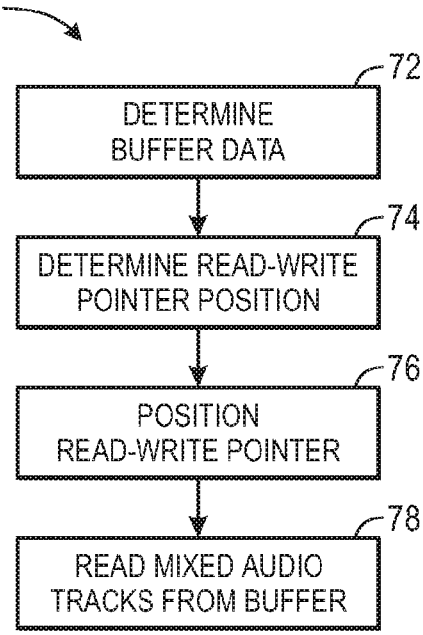
FIG. 8 is a flow chart of dynamically inserted crossfading, in accordance with an embodiment of the present disclosure.

A dynamically inserted crossfade process in one or more embodiments is explained in the flow chart of FIG. 8. The dynamically inserted crossfade process 64 includes determining (block 72) characteristics of the data already in the buffer 26. This buffered data may include pre-decoded data samples of the first audio track 36, or portions of the first audio track 36 which have been decoded prior to receiving the command to transition to a second audio track 38. In some embodiments, data samples corresponding to about 1 second of the first audio track 36 may be stored in the buffer 26 at one time. A processor 22 may then determine an appropriate position in the buffer 26 to point the second write pointer 46. The determination of the second write pointer 46 position may be based on various factors as previously discussed, including characteristics of the codec type of the second audio track 38, the type of decoder 28 used to decode the second audio track 38, the complexity of post processing, and/or the media type of the second audio track 38, etc. The second write pointer 46 may be positioned (block 76) at the appropriate position in the buffer 26, and the read pointer 48 may eventually point to the buffered crossfade (i.e., the combined data samples from the first and second audio tracks 36 and 38) and begin to read (block 78) crossfade from the buffer 26 and output the crossfade to a suitable output 32.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
    decoding a first audio track to generate first data samples;
    buffering the decoded first audio track at a first write pointer pointing to a first buffer;
    reading the first data samples from a read pointer of the first buffer to generate playback of the first audio track;
    decoding a second audio track to generate second data samples;
    mixing the first data samples with the second data samples to generate mixed samples of the first audio track and the second audio track; and
    inserting a second write pointer following the read pointer in the first buffer, wherein the second write pointer points to a position in the first buffer where the mixed samples are written.

2. The method of claim 1, wherein decoding the second audio track is performed in response to receiving a command to transition to the second audio track.

3. The method of claim 1, wherein mixing the first data samples with the second data samples comprises applying a time varying weighting function to fade out the first audio track and to fade in the second audio track.

4. The method of claim 1, wherein mixing the first data samples with the second data samples comprises computing a weighted average between the first data samples and the second data samples.

5. The method of claim 1, wherein inserting the second write pointer comprises inserting the second write pointer immediately following the read pointer.

6. The method of claim 1, wherein inserting the second write pointer comprises inserting the second write pointer at an offset from the read pointer.

7. The method of claim 6, comprising determining the offset based on one or more characteristics related to a codec type of the second audio track, a decoder type for decoding the second audio track, a media type of the second audio track, and a complexity of processing the second audio track.

8. The method of claim 6, comprising determining the offset based on how quickly the second audio track is predicted to be decoded and processed.

9. The method of claim 1, wherein inserting the second write pointer comprises dynamically inserting the second write pointer based on characteristics of the second audio track.

10. The method of claim 1, comprising reading the mixed samples from the read pointer to generate playback of a crossfade from the first audio track to the second audio track.

11. The method of claim 10, comprising reading the second data samples from the first buffer once the crossfade is complete to generate playback of the second audio track.

12. An electronic device, comprising:
    one or more decoders configured to decode a first audio track to produce first data samples and to decode a second audio track to produce second data samples;
    a buffer configured to hold the first data samples, the second data samples, and mixed data samples corresponding to a mixture of the first data samples and the second data samples; and
    a processor configured to substantially control the writing of the first data samples and the mixed data samples in the buffer, wherein the processor is configured to:
        position a read pointer to a beginning portion of the buffer;
        position a first write pointer to an available portion of the buffer; and
        position a second write pointer following the read pointer and before the first write pointer.

13. The electronic device of claim 12, wherein each of the one or more decoders is configured to decode one or more different audio file formats.

14. The electronic device of claim 12, wherein the first audio track comprises a different audio file format than the second audio track.

15. The electronic device of claim 12, wherein the processor is configured to position the second write pointer to a buffer location for writing the mixed data samples.

16. The electronic device of claim 15, wherein the processor is configured to minimize a distance between the read pointer and the second write pointer.

17. The electronic device of claim 15, wherein the processor is configured to offset the second write pointer from the read pointer based on a format of the second audio track.

18. The electronic device of claim 15, wherein the processor is configured to offset the second write pointer from the read pointer based on a type of decoder of the one or more decoders used to decode the second audio track.

19. The electronic device of claim 15, wherein the processor is configured to dynamically insert the second write pointer to minimize a distance between the read pointer and the second write pointer while allocating enough buffer distance to have continuous reading of the mixed data samples.

20. A method of performing a crossfade operation, comprising:
    reading first data samples corresponding to a first audio track from a buffer;
    evaluating characteristics of a second audio track, wherein the characteristics relate to how quickly the second audio track is predicted to be decoded into second data samples;
    writing a mixture of the first data samples and the second data samples to a position in the buffer based on the evaluation of the characteristics of the second audio track; and
    reading the mixture from the buffer to generate playback of a crossfade from the first audio track to the second audio track.

21. The method of claim 20, wherein evaluating the characteristics of the second audio track comprises performing one or more algorithms to determine a decoding and processing speed of the second audio track.

22. The method of claim 20, wherein writing the mixture of the first data samples and the second data samples to the position is based on minimizing the distance between a reading position of the buffer and a writing position of the mixture.

* * * * *